G. S. GRIGG.
Scroll Sawing-Machines.

No. 136,433.

Patented March 4, 1873.

Witnesses:
John Becker.
Francis McArdle.

Inventor:
George S. Grigg
Per
Attorneys.

UNITED STATES PATENT OFFICE.

GEORGE S. GRIGG, OF POTTSVILLE, PENNSYLVANIA.

IMPROVEMENT IN SCROLL-SAWING MACHINES.

Specification forming part of Letters Patent No. 136,433, dated March 4, 1873.

*To all whom it may concern:*

Be it known that I, GEORGE S. GRIGG, of Pottsville, in the county of Schuylkill and State of Pennsylvania, have invented a new and useful Improvement in Scroll-Sawing Machine; and I do hereby declare that the following is a full, clear, and exact description thereof, which will enable others skilled in the art to make and use the same, reference being had to the accompanying drawing forming part of this specification, in which—

Figure 1:
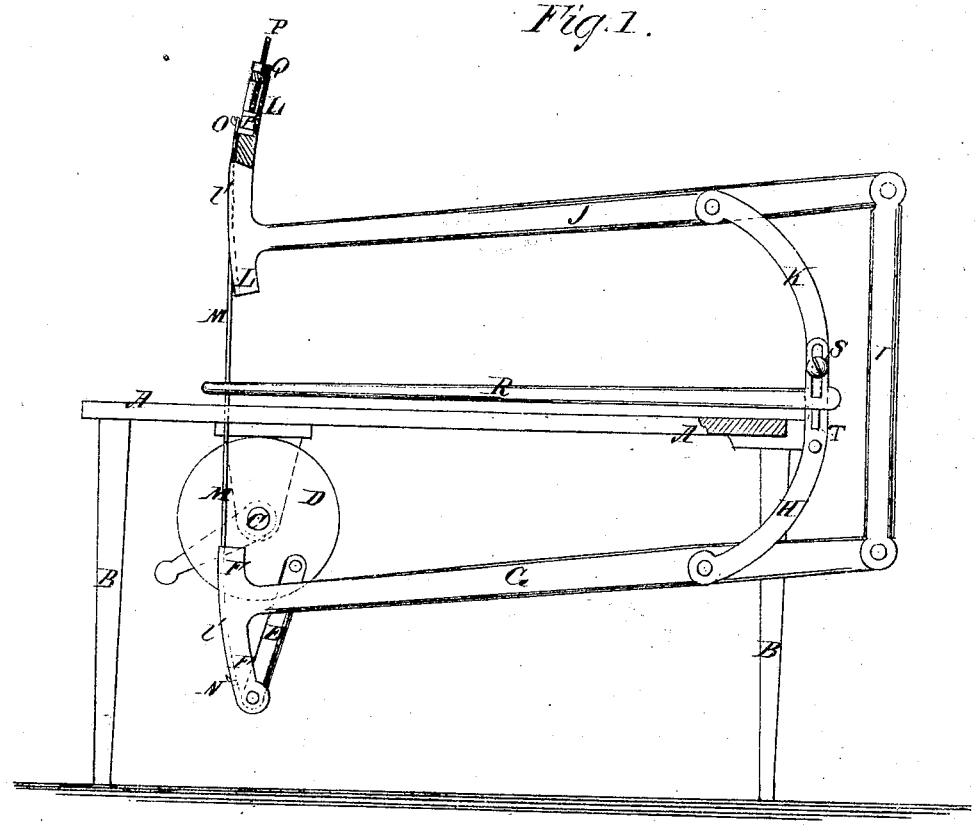
Figure 2:
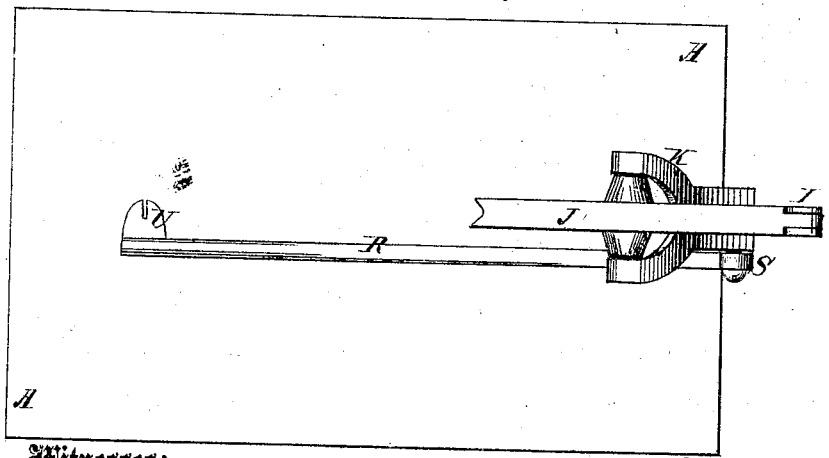

Figure 1 is a side view of my improved machine, parts being broken away to show the construction. Fig. 2 is a top view of the same, part being broken away to show the construction.

Similar letters of reference indicate corresponding parts.

My invention is an improvement in vertical reciprocating sawing-machines; and consists in the arrangement of a lever or plate for guiding the saw, and holder for the material being worked up.

A is the table, and B the legs of the same. C is the driving-shaft; D, the crank-wheel; and E, a connecting-rod. The saw M is provided with holes in its ends, whereby it is attached to the hooks N and O of the cross-heads F L. The latter are formed on the free ends of the levers G J, which have their fulcrums in the brackets H K. The opposite ends of the levers are connected by the bar I. Flanges l' l' are formed on the edge of the convex side of the cross-heads, to hold the saw up to the work. The saw may be strained or tightened by means of the screw P and nut Q.

The operation of the above devices is apparent without further description.

By loosening the nut Q, the saw may be easily and conveniently detached and attached.

R is an arm, the rear end of which has a slotted cross-head, S, attached to or formed upon it, which is grooved upon its inner side to receive a tongue, T, formed upon or attached to the side of the bracket H K. The arm R is secured in place by a screw or bolt, which passes through the slot of the cross-head S, and into or through the said arm or bracket K. By this construction the arm R will be held exactly horizontal, and may be conveniently raised and lowered, as may be desired. To the side of the forward end of the arm R is attached, or upon it is formed, a guide-plate, U, having a slot formed in it leading inward from its forward edge, to receive the rear edge of the saw M, to insure the said saw's moving up and down in a vertical line. The arm R also serves as a guard to prevent the timber being sawed from being raised from the table by the saw in its upstroke.

Having thus described my invention, I claim as new and desire to secure by Letters Patent—

The arm R S U, constructed and attached to the bracket or arm K, substantially as herein shown and described, and for the purposes set forth.

GEORGE S. GRIGG.

Witnesses:
FREDERICK HAESELER,
CHAS. KNECHT.